R. F. STEIN.

METHOD FOR DISMANTLING SECONDARY BATTERIES.

APPLICATION FILED DEC. 23, 1920.

Reissued Nov. 15, 1921. 15,230.

Inventor,
Rudolph F. Stein,
by Henry D. Bright
Attorney

UNITED STATES PATENT OFFICE.

RUDOLPH F. STEIN, OF MINNEAPOLIS, MINNESOTA, ASSIGNOR TO UNITED STATES ORDNANCE COMPANY, OF WASHINGTON, DISTRICT OF COLUMBIA, A CORPORATION OF VIRGINIA.

METHOD FOR DISMANTLING SECONDARY BATTERIES.

15,230. Specification of Reissued Letters Patent. Reissued Nov. 15, 1921.

Original No. 1,358,344, dated November 9, 1920, Serial No. 305,375, filed June 19, 1919. Application for reissue filed December 23, 1920. Serial No. 432,882.

*To all whom it may concern:*

Be it known that I, RUDOLPH F. STEIN, a citizen of the United States, residing at Minneapolis, in the county of Hennepin and State of Minnesota, have invented certain new and useful Improvements in Methods for Dismantling Secondary Batteries, of which the following is a specification.

My invention relates to an improved method for dismantling secondary batteries in whole or in part.

The removal of the jar covers or of the jar covers and jars of secondary batteries presents a serious problem owing to the time necessary under present methods to effect the removal of the sealing compound which secures these elements of the battery within the usual casing and also owing to the undesirable conditions created by the odor arising under the present practice of applying hot chisels to the sealing compound to effect its removal.

It is therefore the purpose of my present invention to provide an improved method for effecting the removal of the jar covers or of the jar covers and jars which will materially reduce the time required in removing the said elements of the battery, which will prevent injury to jar covers and to the jars and which will eliminate the presence of disagreeable odors in the workshop caused by burning of the sealing compound when the latter is removed through the instrumentality of hot chisels.

My improved method will be more clearly understood from the following detail description taken in connection with the accompanying drawing wherein—

Figure 1:
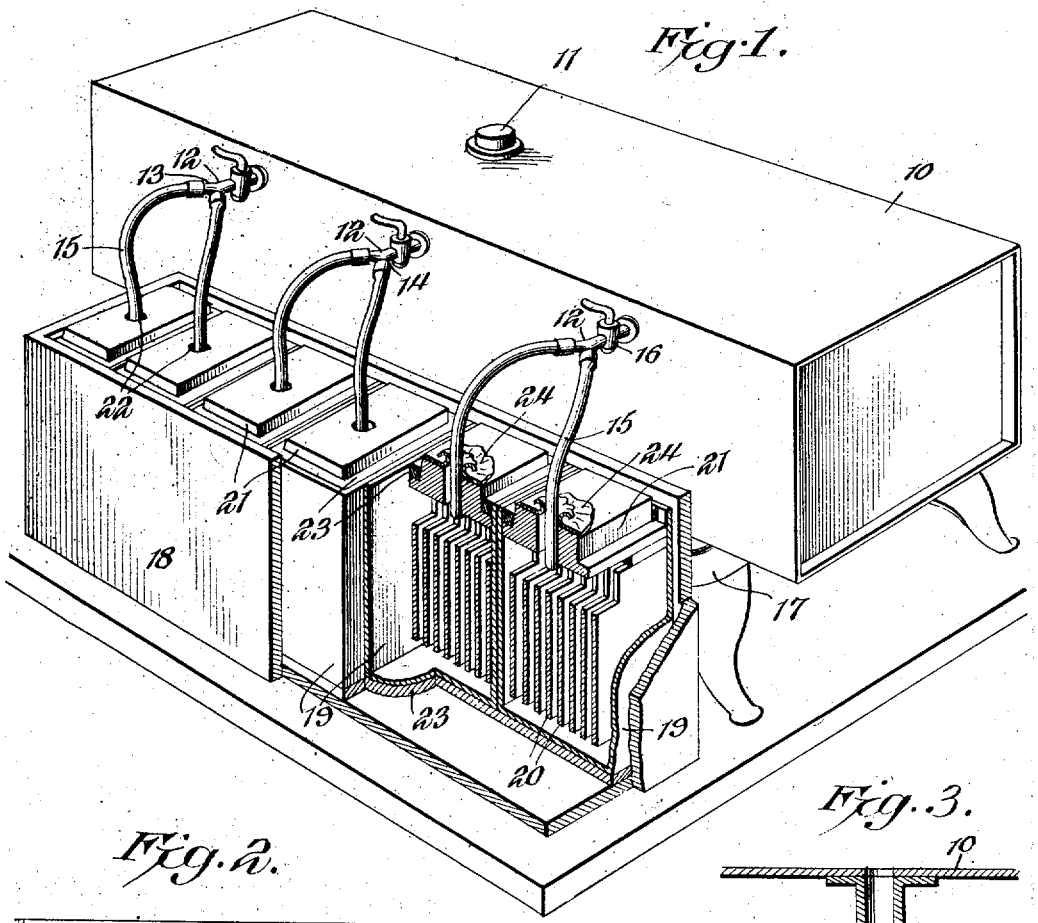
Figure 2:
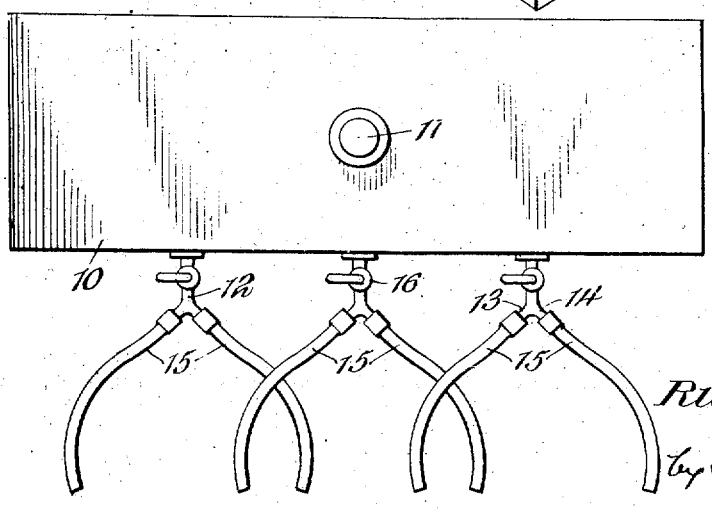
Figure 3:
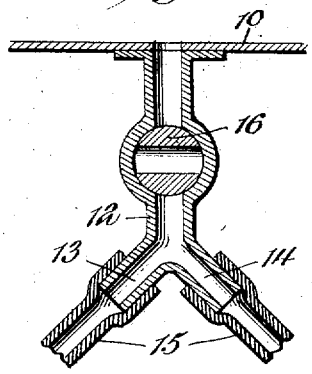

Figure 1 is a perspective view illustrative of my improved method and showing the apparatus for carrying the method into practice operatively associated with a plural cell secondary battery, the latter being shown in section;

Fig. 2 a plan view of one form of apparatus suitable for carrying my method into practice; and Fig. 3, a section through one of the steam conveying nozzles of the apparatus.

Referring now particularly to the drawings I have shown an apparatus capable of use in dismantling 12 volt secondary batteries or secondary batteries of less than 12 volts. Such apparatus comprises a boiler 10 having a filling opening closed by a cap 11. Leading from the interior of the boiler 10 near the top of the latter are three steam conveying nozzles 12 each of which has its outer end forked to form furcations 13 and 14 and on which latter are engaged respectively flexible pipes 15 preferably constructed of pure gum rubber and of suitable length for the purposes intended. Each of the nozzles 12 is provided with a valve 16 for controlling the flow of steam from the boiler which latter is supported above any suitable heating apparatus after being filled with the desired quantity of water. In this instance I show the boiler supported upon an ordinary gas stove 17.

In the secondary battery illustrated 18 is the casing of the battery, 19 the jars, 20 the positive and negative plates and separators contained in each jar, 21 the jar tops, 22 the vent openings of the tops and 23 the sealing compound which secures the jars and tops in place all as is well known.

Assuming that it is desired to remove the tops 21 of the jars 19 the closures of the vent openings 22 are first removed and the pipes 15 introduced through said vent openings. The necessary quantity of steam is then raised in the boiler 10 and the valves 16 opened to deliver the steam within the battery through the pipes 15. The delivered steam is confined within the battery by means of burlap 24 or other suitable packing placed over the top of the battery and around the ends of the pipes 15 where the latter enter the vent holes. The introduction of steam into the battery is continued for about ten minutes or until such time as the sealing compound 23 is heated sufficiently to render the same plastic. When this status of the sealing compound is had the burlap 24 is removed and the compound subsequently removed with the aid of a putty knife or other suitable instrument. When the removal of the plastic compound is completed the jar tops 21 can be easily lifted away. By resorting to the method just described no odor is created and the removal of the jar tops is effected in about one-half the time required when the use of hot chisels is depended upon to remove the sealing compound.

If it is then desired to remove the jars it is only necessary to first remove the plates and separators from within the jars and then repeat the operation just described until the sealing compound holding the jars is reduced to a plastic state when it is possible to withdraw the jars with a pair of pincers or pliers or even with the hand.

While I have described two separate operations for effecting the complete dismantling of the battery it would be possible to sufficiently heat the sealing compound in the first instance to such a degree as would permit the removal of both the covers and the jars as a result of only a single heating of the sealing compound. However, I have found it somewhat preferable to carry out the method in the manner previously described.

I claim:—

1. The herein described method of removing jar covers of secondary batteries which consists in heating the sealing compound to a degree to render the same substantially plastic by introducing steam within the jars, removing said sealing compound while plastic, and then removing the jar covers.

2. The herein described method of removing jar tops and jars of secondary batteries which consists in heating the sealing compound to a degree to render the same substantially plastic by introducing and confining steam within the jars, removing the top holding sealing compound while plastic, removing the released tops and the plates from the jars, replacing the tops, again introducing and confining steam within the jars to heat the jar holding sealing compound to a degree to render the same substantially plastic and then manually withdrawing the jars while the consistency of the sealing compound remains plastic.

3. The herein described method of removing jar covers of secondary batteries which consists in inserting piping leading from a suitable steam supply through the vent openings of the covers, discharging steam conveyed by said piping into the jars and confining the steam so introduced to heat the sealing compound to a degree to render the same plastic, removing the sealing compound while plastic, and then removing the covers.

4. The herein described method of removing jar covers of secondary batteries which consists in introducing gas within the jars at a temperature sufficient to render the sealing compound plastic, removing said sealing compound while plastic, and then removing the jar covers.

5. The herein described method of removing jar tops and jars of secondary batteries which consists in introducing gas within the jars at a temperature sufficient to render the sealing compound plastic, removing the top holding sealing compound while plastic, removing the released tops and the plates from the jars, replacing the tops, again introducing heated gas within the jars to render the jar holding sealing compound plastic, and then manually withdrawing the jars while the consistency of the sealing compound remains plastic.

6. The method of loosening the seal on a storage battery, which consists in applying low pressure steam thereto and covering the top of the battery to confine the steam, whereby the seal is gradually softened.

7. The method of loosening the seal on a storage battery, which consists in applying steam thereto and confining the steam therein, whereby the seal is softened.

8. The method of loosening the seal on a storage battery, which consists in applying steam within the battery to soften the seal.

In testimony whereof I affix my signature.

RUDOLPH F. STEIN.